United States Patent Office 3,138,562
Patented June 23, 1964

3,138,562
CELLULAR POLYURETHANE PLASTICS
Günther Nischk and Günther Braun, Leverkusen, and Peter Hoppe, Troisdorf, Germany, assignors to Farbenfabriken Bayer Aktiengesellschaft, Leverkusen, Germany, a corporation of Germany
No Drawing. Filed May 20, 1960, Ser. No. 31,252
Claims priority, application Germany May 23, 1959
7 Claims. (Cl. 260—2.5)

This invention relates generally to polyurethane plastics and more particularly to a method for making cellular polyurethane plastics which have improved porosity, improved temperature resistant characteristics and improved water repellency.

It has been proposed heretofore to manufacture cellular polyurethane plastics by reacting an organic polyisocyanate with an organic compound containing at least two active hydrogen containing groups and having a molecular weight of at least about 500. If necessary, water is included in the reaction mixture to produce the cellular product. These heretofore available cellular polyurethane plastics are not resistant to temperatures above about 90° C. and consequently, are unsuitable for use in applications where the cellular product will be exposed to temperatures above about 90° C. for any appreciable length of time. It has been proposed heretofore in German Patent 1,020,179 to improve the temperature resistance of cellular polyurethane plastics by reacting branched polyesters and/or polyester amides having terminal hydroxyl groups and/or carboxyl groups, at least one of the acid components thereof containing at least one unsaturated fatty acid with water and an excess of an organic polyisocyanate to prepare cellular polyurethane plastics which have improved resistance to elevated temperatures. These cellular polyurethane plastics have low water absorption but it is desirable to further lower the water absorption thereof.

It is, therefore, an object of this invention to provide a method for making cellular polyurethane plastics having improved resistance to elevated temperatures of 90° C. or more and having low water absorption characteristics. A further object of the invention is to provide a method for making cellular polyurethane plastics having improved pore structure and improved resistance to water. Still another object of the invention is to provide a method for making low density cellular polyurethane plastics having improved rise times and improved solidifying times. Another object of the invention is to provide a method of making cellular polyurethane plastics which are resistant to temperatures above 90° C. and up to about 160° C.

The foregoing objects and other which will become apparent from the following description are accomplished in accordance with the invention, generally speaking, by providing cellular polyurethane plastics obtained from branched polyesters and/or polyester amides which are prepared from a polyhydric alcohol, a polycarboxylic acid, a monomeric ethylenically unsaturated fatty acid and a polyhydric polyalkylene ether, with an organic polyisocyanate in the presence of a gas producing agent to form said cellular polyurethane plastic. The polyhydric polyalkylene ether used in the preparation of the polyester should have a molecular weight of at least about 400 and at least about 50 percent of the alkylene groups in said polyhydric polyalkylene ether should contain at least three carbon atoms. The invention therefore, provides cellular polyurethane plastics which have improved resistance to elevated temperatures of up to about 160° C. which are obtained by reacting an organic polyisocyanate with water and a polyester and/or polyester amide prepared from the components set forth above. In other words, the heretofore known cellular polyurethane plastics which are resistant to elevated temperatures can be even further improved by employing an already prepared polyhydric polyalkylene ether in the preparation of the polyester and then using this complex polyester to prepare said cellular polyurethane plastic. Preferably an amount of the organic polyisocyanate in excess of that theoretically required to react with all of the hydroxyl groups on the polyester and/or polyester amides is used.

The polyester and/or polyester amide, the organic polyisocyanate and water or other gas producing agent may be mixed together simultaneously or the polyester may be reacted with an excess of the organic polyisocyanate in a first step under substantially anhydrous conditions to produce a prepolymer having terminal —NCO groups which is subsequently reacted with water to bring about chemical reaction between the terminal isocyanate groups of the prepolymer to form compounds of higher molecular weight and carbon dioxide. The water will also react with the isocyanate groups of any monomeric isocyanate remaining in the mixture to yield additional carbon dioxide.

Any suitable polyester obtained from the components set forth above may be used in accordance with the process of the present invention. It is preferred to employ polyesters having a molecular weight of at least about 500, a hydroxyl number of at least about 150 and an acid number below about two which are obtained from a monomeric polyhydric alcohol, a saturated aliphatic di- or tricarboxylic acid, an aromatic di- or tricarboxylic acid, a monomeric ethylenically unsaturated monocarboxylic fatty acid and a polyhydric polyalkylene ether having from two to four hydroxyl groups and a molecular weight of at least about 400, at least about 50 percent of the alkylene groups of said polyhydric polyalkylene ether containing three to ten carbon atoms. Any suitable polyhydric alcohol may be used such as, for example, ethylene glycol, propylene glycol, butylene glycol, trimethylol propane monoallyl ether, hexanetriol, trimethylol propane, pentaerythritol, pentaerythritol dibenzyl ether, 4,4'-di(hydroxyethoxy)-diphenyl dimethyl methane, N-dihydroxyethyl aniline, N-methyl diethanolamine, N,N'-dihydroxyethyl piperazine and the like. Preferably at least about 50 percent of the polyhydric alcohol will be an alcohol having more than two hydroxyl groups such as, for example, sorbitol, mannitol, pentaerythritol, trimethylol propane, glycerine and the like.

Any suitable polycarboxylic acid may be used, including any suitable saturated aliphatic dicarboxylic or tricarboxylic acid. Thus, suitable saturated aliphatic polycarboxylic acids are, for example, adipic acid, succinic acid, sebacic acid, 6-amino caproic acid, citric acid and the lke. Any suitable aromatic polycarboxylic acid may be used such as, for example, phthalic anhydride, terephthalic acid, isophthalic acid, naphthylene-1,2-dicarboxylic acid, 1,3,5-benzene tricarboxylic acid and the like.

Any suitable monomeric ethylenically unsaturated fatty acid may be used such as, for example, oleic acid, elaidic acid, linoleic acid, ricinoleic acid, dehydrated ricinoleic acid and the like.

Any suitable polyhydric polyalkylene ether may be used in the preparation of the polyester providing it contains at least about 50 percent of alkylene groups having at least three carbon atoms and having a molecular weight of at least about 400. The polyhydric polyalkylene ethers are prepared, for example, by the polymerization of an alkylene oxide or by reaction of an alkylene oxide with a polyhydric alcohol. Any suitable alkylene oxide may be used such as, for example, propylene oxide, butylene oxide, phenoxy propylene oxide, tetrahydrofuran, epihalohydrins such as, epichlorohydrin and aralkylene oxides such as styrene oxide. Thus, the polyhydric polyalkylene ethers employed in the preparation of the polyester may be either linear or branched and are, for example, polypropylene glycols, poly-1-ethyl ethylene glycols, polyphenoxy propylene glycols, polybutylene-1,4-glycols, each having a molecular weight of above about 400. Moreover, the alkylene oxides set forth above may be condensed with any suitable dihydroxy or higher polyhydroxy alcohol to prepare either linear or branched polyhydric polyalkylene ethers. Suitable polyhydric alcohols are set forth above. Ethylene oxide may also be used in the preparation of the polyhydric polyalkylene ether but should not be used in quantities greater than about 50 mol percent based on the total quantity of alkylene oxides being used. The polyesters preferably have incorporated therein from about 10 percent to about 70 percent by weight of the polyhydric polyalkylene ethers. Preferably from about 15 percent to about 40 percent of the polyester is made up of the polyhydric polyalkylene ether component incorporated therein by condensation. Polyhydric polyalkylene ethers prepared by a process disclosed by Wurtz in 1859, Encyclopedia of Chemical Technology, vol. 7, pp. 157–262 published by Interscience Publishers, Inc. 1951 and in U.S. Patent 1,922,459 are suitable.

Any suitable organic polyisocyanate including aromatic and aliphatic polyisocyanates may be used in the process of the present invention such as, for example, toluylene-2,4-diisocyanate, toluylene-2,6-diisocyanate or mixtures thereof, 1,6-hexamethylene diisocyanate, m-phenylene diisocyanate, p-phenylene diisocyanate, 4,4'-diphenylmethane diisocyanate, N,N'N"-tris(isocyanatohexyl)biuret, 1,5-naphthylene diisocyanate, triphenylmethane triisocyanate, 3,3'-dichloro-4,4'-biphenylene diisocyanate or the like. Heterocyclic polyisocyanates such as furfurylidene diisocyanate are also included. As indicated hereinbefore, more polyisocyanate than is required to react with all of the functional groups, i.e., hydroxyl and carboxyl groups of the polyester and water may be used. It is preferred to use at least about two times the theoretical molar requirement of polyisocyanate.

It is often advantageous to include in the reaction mixture a catalyst such as, for example, tertiary amines, such as, N-methyl morpholine, N-ethyl morpholine, N,N,N',N'-tetramethyl butane-1,4-diamine, N-diethyl ethylamine, permethylated diethylene triamine, dimethyl benzyl amine, permethylated aminoethyl piperazine and the like. Other suitable catalysts are, for example, organo-tin compounds such as, dibutyl tin dilaurate as well as other compounds disclosed in copending applications Serial Nos. 1,870, 1,883 and in U.S. Patent 2,846,408. In addition, it is often advantageous to include emulsifiers such as, for example, castor oil sulphonate and the like and/or foam stabilizers such as, for example, polydimethyl siloxanes, alkyl silane oxyalkylene block copolymers such as those disclosed, for example, in U.S. Patent 2,834,748 as well as hydroxy alkylated polysiloxanes such as, for example, hydroxy ethylated polysiloxanes and the like.

If water is included in the reaction mixture, it will react with any free isocyanate present to produce carbon dioxide which will cause expansion of the polymer produced by reaction between the polyester and the polyisocyanate to form a cellular product. However, it is not essential that water be present in the reaction mixture and alternately, the highly porous structure of the polyurethane plastics of the invention can be produced by employing polyesters which have a large number of free carboxyl groups which will also react with the isocyanate groups to split off carbon dioxide. Other blowing agents which will produce gas in response to the exotherm of the reaction mixture include, azoisobutyric acid dinitrile, azohexahydrobenzoic acid dinitrile, dinitrosopentamethylene tetramine, methylene chloride, halohydrocarbons, such as, trichlorofluoromethane or ethane and the like.

It is also possible to include in the reaction mixture small amounts of the conventional polyesters, such as, for example, the condensation product of adipic acid and ethylene glycol, polyhydric polyalkylene ethers of the class set forth above which have not been condensed into the polyesters and the like. Not more than about 25 percent by weight of these conventional polyesters and/or polyethers based on the weight of the polyester described above should be included in the reaction mixture.

The cellular polyurethane plastics of the invention in addition to having a high resistance to elevated temperatures as evidenced by their high heat distortion points also have a very low water absorption which is only about one tenth of that of the heretofore known cellular polyurethane plastics. Further, the plastics of the invention can be produced much more conveniently on a continuous basis because their rise time and solidifying time is greatly reduced. This shortened rise time and solidifying time is especially important in the filling of large structures such as, wall panels and the like which have a volume of more than about three cubic feet. Due to the shortened rise time and solidifying time large cavities can be filled without any formation of blow holes and cracks resulting from the heat produced during the reaction and without diluting the cellular polyurethane plastic with a filler to absorb the heat of the reaction.

It can be seen, therefore, that the products of the invention are useful for the production of both thermal and sound insulation as in the preparation of filled wall panels and the like. Moreover, they may be used in the production of molded objects such as ornaments, toys and the like.

The invention is further illustrated by the following examples in which the parts are by weight unless otherwise indicated.

*Example 1*

A polyester having the acid number of substantially 0 and an hydroxyl number of about 235, obtained from about 1,370 parts of trimethylol propane, about 292 parts of adipic acid, about 592 parts of phthalic acid anhydride, about 566 parts of oleic acid and about 620 parts of a propoxylated trimethylol propane having an hydroxyl number of about 112 and a molecular weight of about 1,500 by heating to about 195 to about 200° C. and passing over nitrogen or carbon dioxide. The resulting polyester has a viscosity of about 4,000 centipoises at 50° C.

About 100 parts of this polyester are thoroughly mixed with an accelerator mixture containing about 1 part of dimethyl benzylamine, about 4 parts of a 50 percent aqueous solution of the sodium salt of castor oil sulphonate and about 0.3 part of a hydroxyethylated polysiloxane. This mixture is foamed by adding about 84 parts of a mixture of 65 percent 2,4- and 35 percent 2,6-toluylene diisocyanate.

A foam material which is not brittle is obtained, the said material having a uniform pore structure with the following physical properties:

Density _____ kg./m.$^3$__ 35
Compressive strength_____ kg./cm.$^2$__ 1.3
Impact toughness_____ kg./cm.__ 0.33
Heat deflection temperature (load 10 grams)__° C__ 142
Water absorption_____ percent__ 0.4

*Example 2*

A polyester having the acid number of about 2 and an hydroxyl number of about 180 is prepared from about 900 parts of trimethylol propane, about 263 parts of adipic acid, about 533 parts of phthalic anhydride, about 510 parts of oleic acid and about 1116 parts of the propoxylated trimethylol propane referred to in Example 1, while stirring and passing over nitrogen at about 195 to about 205° C. A mixture of about 80 parts of this polyester and about 20 parts of a polyester obtained from about 1.43 mols of adipic acid, about 1 mol of butane-1,3-diol and about 1 mol of hexanetriol and having an hydroxyl number of about 218 is mixed with about 1 part of dimethyl benzylamine and about 5 parts of a 50 percent aqueous solution of the sodium salt of castor oil sulphonate. This mixture is foamed with about 80 parts of a mixture of 65 percent 2,4- and 35 percent 2,6-toluylene diisocyanate. There is obtained a fine-pored foam which does not shrink and which has the following properties:

| | |
|---|---|
| Density _____kg./m.$^3$__ | 40 |
| Compressive strength_____kg./cm.$^2$__ | 1.6 |
| Impact toughness_____kg./cm.$^2$__ | 0.4 |
| Heat deflection temperature (load 10 grams)__° C__ | 130 |
| Water absorption_____percent__ | 0.7 |

*Example 3*

A polyester having an acid number of about 3 and an hydroxyl number of about 165 is condensed from about 900 parts of trimethylol propane, about 409 parts of adipic acid, about 510 parts of oleic acid, about 385 parts of phthalic acid anhydride and about 1,150 parts of the propoxylated trimethylol propane described in Example 1 while passing over carbon dioxide and stirring at about 195 to about 205° C. The vacuum esterification lasted altogether about 9 hours. About 100 parts of this polyester are thoroughly mixed with about 0.5 part of permethylated aminoethylpiperazine and about 5 parts of a 50 percent aqueous solution of the sodium salt of castor oil sulphonate. This mixture is foamed with about 76 parts of a mixture of 65 percent 2,4- and 35 percent 2,6-toluylene diisocyanate and has the following properties:

| | |
|---|---|
| Density _____kg./m.$^3$__ | 42 |
| Compressive strength_____kg./cm.$^2$__ | 1.5 |
| Impact toughness_____kg./cm.$^2$__ | 0.6 |
| Heat deflection temperature (load 10 grams)__° C__ | 110 |
| Water absorption_____percent__ | 0.3 |

*Example 4*

A branched polyester having an acid number of about 3 and an hydroxyl number of about 350 is prepared from about 1,500 parts of trimethylol propane, about 292 parts of adipic acid, about 592 parts of phthalic acid anhydride, about 566 parts of oleic acid and about 620 parts of a linear polypropylene glycol having an hydroxyl number of about 56 and a molecular weight of about 2,000 under the conditions set out in Example 1. About 100 parts of this polyester are mixed with about 1 part of ethyl morpholine and about 5 parts of a 50 percent aqueous solution of the sodium salt of castor oil sulphonate. This mixture is foamed with about 117 parts of a mixture of 65 percent 2,4- and 35 percent 2,6-toluylene diisocyanate.

The foam has the following properties:

| | |
|---|---|
| Density _____kg./m.$^3$__ | 37 |
| Compressive strength_____kg./cm.$^2$__ | 1.38 |
| Impact toughness_____kg./cm__ | 0.18 |
| Heat deflection temperature (load 10 grams)__° C__ | 160 |
| Water absorption_____percent__ | 0.18 |

*Example 5*

A polyester having an acid number of about 1 and an hydroxyl number of about 200 is condensed from about 1,200 parts of trimethylol propane, about 888 parts of phthalic acid anhydride, about 600 parts of ricinoleic acid and about 1,100 parts of a linear polypropylene glycol having an hydroxyl number of about 56. About 100 parts of this polyester are mixed with an accelerator mixture containing about 1 part of dimethyl benzylamine, about 4 parts of a 50 percent aqueous solution of the sodium salt of castor oil sulphonate and about 0.3 part of an oxethylated polysiloxane. The mixture is foamed with about 80 parts of a mixture of 65 percent 2,4- and 35 percent 2,6-toluylene diisocyanate. A non-brittle foam material is obtained which has a uniform pore structure and the water absorption of which is about 0.4 percent.

*Example 6*

About 50 parts of a polyester having an acid number of about 1, an hydroxyl number of about 360 and prepared from adipic acid, phthalic acid, oleic acid and trimethylol propane are mixed with about 50 parts of the polyester described in Example 1, having an acid number of about 1.8 and an hydroxyl number of about 229. This mixture is thereafter stirred with about 1 part of permethylated aminoethylpiperazine and thereafter it is foamed by adding a mixture of about 81 parts of 4,4'-diphenylmethane diisocyanate and about 20 parts of trichlorofluoromethane. A fine-pored material is obtained which has the following physical properties:

| | |
|---|---|
| Density _____kg./m.$^3$__ | 45 |
| Compressive strength_____kg./cm.$^2$__ | 1.9 |
| Impact toughness_____kg./cm__ | 0.53 |
| Heat deflection temperature (load 10 grams) _____° C__ | 112 |
| Water absorption_____percent__ | 0.2 |

*Example 7*

About 900 parts of trimethylol propane, about 354 parts of succinic acid, about 440 parts of isophthalic acid, about 510 parts of oleic acid and about 1,200 parts of hepta-1,4-butylene glycol having a molecular weight of about 522 are heated while passing over nitrogen or carbon dioxide to about 130° C. until the main part of the water which has formed is distilled off. A vacuum is then applied for about 8 hours and there is obtained a brownish-yellow polyester having an hydroxyl number of about 255 and an acid number of about 2.

About 100 parts of this polyester are thoroughly mixed with an accelerator mixture of about 1 part of dimethyl benzyl amine, about 4 parts of 50 percent aqueous solution of the sodium salt of castor oil sulphonate and 0.3 part of an oxethylated polysiloxane. This mixture is foamed with about 90 parts of a mixture of 65 percent 2,4- and 35 percent 2,6-toluylene diisocyanate and there is obtained a hard foam with a uniform pore structure:

| | |
|---|---|
| Density _____kg./m.$^3$__ | 35 |
| Compressive strength_____kg./cm.$^2$__ | 1.5 |
| Heat deflection temperature (load 10 grams) _____° C__ | 138 |
| Water absorption_____percent__ | 0.2 |

It is to be understood that any other suitable reactant could have been used in the preceding working examples in accordance with the foregoing disclosure with satisfactory results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A cellular polyurethane plastic obtained by a process which comprises reacting, in the presence of a blowing agent, an organic polyisocyanate with a polyester obtained by a process which comprises reacting a monomeric polyhydric alcohol, a polycarboxylic acid, a monomeric unsaturated long chain fatty acid and a polyhydric polyalkylene ether having a molecular weight of at least about 400, at least about 50 percent of the alkylene radicals of said polyhydric polyalkylene ether containing at least three carbon atoms.

2. A cellular polyurethane plastic obtained by a process which comprises reacting, in the presence of a blowing agent, an organic polyisocyanate with a polyester obtained by a process which comprises reacting a polyhydric alcohol free of ether groups, a polycarboxylic acid, a monomeric unsaturated long chain fatty acid and a polyhydric polyalkylene ether having a molecular weight of at least about 400, at least about 50 percent of the alkylene radicals of said polyhydric polyalkylene ether containing at least three carbon atoms.

3. A cellular polyurethane plastic obtained by a process which comprises reacting, in the presence of a blowing agent selected from a group consisting of water and a halohydrocarbon, an organic polyisocyanate with a polyester obtained by a process which comprises reacting a polyhydric alcohol free of ether groups, a polycarboxylic acid, selected from the group consisting of aliphatic di and tri-carboxylic acids and aromatic di and tri-carboxylic acids, a monomeric unsaturated long chain fatty acid and a polyhydric polyalkylene ether having a molecular weight of at least about 400, at least about 50 percent of the alkylene radicals of said polyhydric polyalkylene ether containing at least three carbon atoms.

4. A cellular polyurethane plastic obtained by a process which comprises reacting, in the presence of a blowing agent, an organic polyisocyanate with a polyester obtained by a process which comprises reacting a polyhydric alcohol free of ether groups, an aliphatic polycarboxylic acid, a monomeric unsaturated long chain fatty acid and a polyhydric polyalkylene ether having a molecular weight of at least about 400, at least about 50 percent of the alkylene radicals of said polyhydric polyalkylene ether containing at least three carbon atoms.

5. The cellular plastic of claim 3 wherein the blowing agent is a halohydrocarbon.

6. The cellular polyurethane plastic of claim 3 wherein the blowing agent is water.

7. A cellular polyurethane plastic obtained by a process, which comprises reacting, in the presence of water as a blowing agent, a toluylene diisocyanate with a polyester obtained by heating to a temperature of about 195 to 200° C., trimethylol propane, adipic acid, oleic acid, phthalic acid anhydride and a polyhydric polyalkylene ether obtained from trimethylol propane and propylene oxide, said reaction between the diisocyanate and polyester taking place in the presence of a small amount of a tertiary amine.

References Cited in the file of this patent

UNITED STATES PATENTS

| 2,866,774 | Price | Dec. 30, 1958 |
| 2,929,794 | Simon et al. | Mar. 22, 1960 |

FOREIGN PATENTS

| 1,020,179 | Germany | May 8, 1958 |
| 1,067,209 | Germany | Oct. 15, 1959 |
| 821,342 | Great Britain | Oct. 7, 1959 |